United States Patent
Forte et al.

(10) Patent No.: US 10,690,106 B2
(45) Date of Patent: Jun. 23, 2020

(54) ELECTRONIC IGNITION SYSTEM FOR AN INTERNAL COMBUSTION ENGINE AND CONTROL METHOD FOR SAID ELECTRONIC IGNITION SYSTEM

(71) Applicant: ELDOR CORPORATION S.P.A., Orsenigo (como) (IT)

(72) Inventors: Pasquale Forte, Orsenigo (IT); Stefano Silva, Orsenigo (IT); Eugenio Carugati, Orsenigo (IT)

(73) Assignee: ELDOR CORPORATION S.P.A., Orsenigo (Como) (IT)

( * ) Notice: Subject to any disclaimer, the term of this patent is extended or adjusted under 35 U.S.C. 154(b) by 0 days.

(21) Appl. No.: 15/574,082

(22) PCT Filed: Apr. 21, 2016

(86) PCT No.: PCT/IB2016/052266
§ 371 (c)(1),
(2) Date: Nov. 14, 2017

(87) PCT Pub. No.: WO2016/181243
PCT Pub. Date: Nov. 17, 2016

(65) Prior Publication Data
US 2018/0298869 A1 Oct. 18, 2018

(30) Foreign Application Priority Data
May 14, 2015 (IT) .............................. MI2015A0678

(51) Int. Cl.
*F02P 9/00* (2006.01)
*F02P 15/10* (2006.01)
(Continued)

(52) U.S. Cl.
CPC ........... *F02P 3/0407* (2013.01); *F02P 3/0442* (2013.01); *F02P 5/15* (2013.01); *F02P 9/002* (2013.01);
(Continued)

(58) Field of Classification Search
CPC .......... F02P 3/0442; F02P 3/0407; F02P 3/02; F02P 3/05; F02P 3/051; F02P 5/15;
(Continued)

(56) References Cited

U.S. PATENT DOCUMENTS

| 4,641,626 A | 2/1987 | Morino et al. |
| 10,190,564 B2 * | 1/2019 | Ruan ...................... F02P 3/045 |

(Continued)

FOREIGN PATENT DOCUMENTS

| EP | 2985449 A1 | 2/2016 |
| JP | H09121549 A | 5/1997 |

(Continued)

OTHER PUBLICATIONS

PCT/IB2016/052266, Jul. 25, 2016, International Search Report / Written Opinion.

*Primary Examiner* — George C Jin
(74) *Attorney, Agent, or Firm* — Workman Nydegger

(57) ABSTRACT

An electronic ignition system for an internal combustion engine. The system includes an ignition coil provided with at least a primary winding and a secondary winding, a switch connected to the primary winding and drivable to be in an opened and/or closed position according to a value of a driving signal, a control unit associated to the switch and configured to drive the switch to be in the open position and/or closed position according to the value of the driving signal (G). The system may also include current detection means associated with the secondary winding, in which the control unit is associated with the detection means for (Continued)

receiving a signal representative of at least a current value in the secondary winding, and configured to control the switch according to said signal.

13 Claims, 6 Drawing Sheets

(51) Int. Cl.
    *F02P 3/04*     (2006.01)
    *F02P 5/15*     (2006.01)
    *F02P 17/12*     (2006.01)
    *F02P 3/02*     (2006.01)

(52) U.S. Cl.
    CPC .............. *F02P 15/10* (2013.01); *F02P 17/12* (2013.01); *F02P 3/02* (2013.01); *F02P 9/007* (2013.01); *Y02T 10/46* (2013.01)

(58) Field of Classification Search
    CPC .......... F02P 5/1502; F02P 9/002; F02P 9/007; F02P 15/10; F02P 17/12; F23Q 3/004; F23Q 3/006; H01T 13/60
    See application file for complete search history.

(56) References Cited

U.S. PATENT DOCUMENTS

| | | |
|---|---|---|
| 2002/0066444 A1 | 6/2002 | Ikeda et al. |
| 2002/0121272 A1 | 9/2002 | Kraus |
| 2003/0089355 A1* | 5/2003 | Vogel ................ F02P 15/10 123/620 |
| 2007/0175461 A1 | 8/2007 | Wada et al. |
| 2011/0041804 A1 | 2/2011 | Petruska |
| 2013/0208393 A1 | 8/2013 | Hampton et al. |
| 2013/0241429 A1* | 9/2013 | Ruan ................ F02P 3/053 315/220 |
| 2015/0034059 A1 | 2/2015 | Heise et al. |
| 2015/0171600 A1* | 6/2015 | Burrows ............ G01M 15/02 361/230 |

FOREIGN PATENT DOCUMENTS

| | | |
|---|---|---|
| JP | 2007231927 A | 9/2007 |
| JP | 2011001851 A | 1/2011 |
| JP | 2014218995 | 11/2014 |
| JP | 2014218995 A | 11/2014 |
| WO | 2012106807 | 8/2012 |
| WO | WO 2014060979 A1 | 4/2014 |

\* cited by examiner

Fig.6
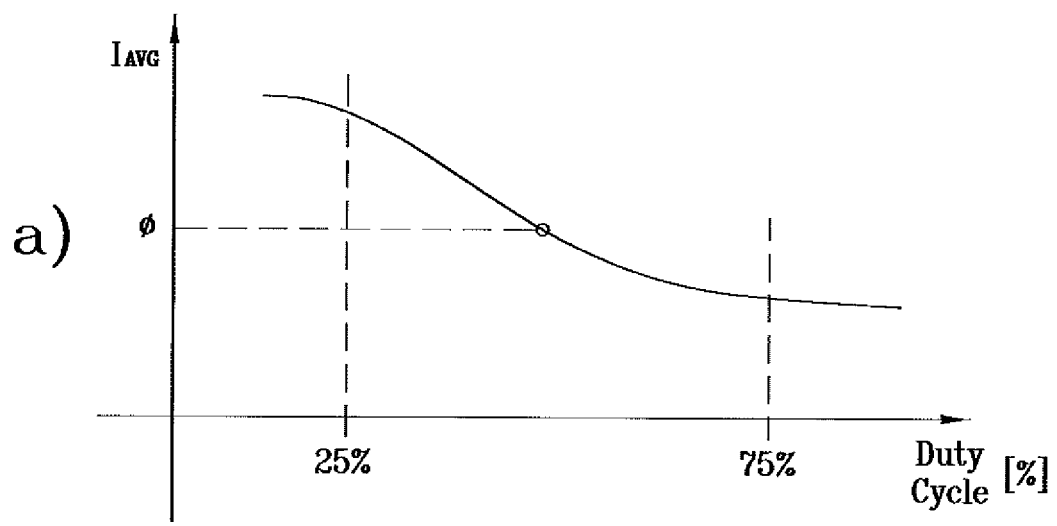
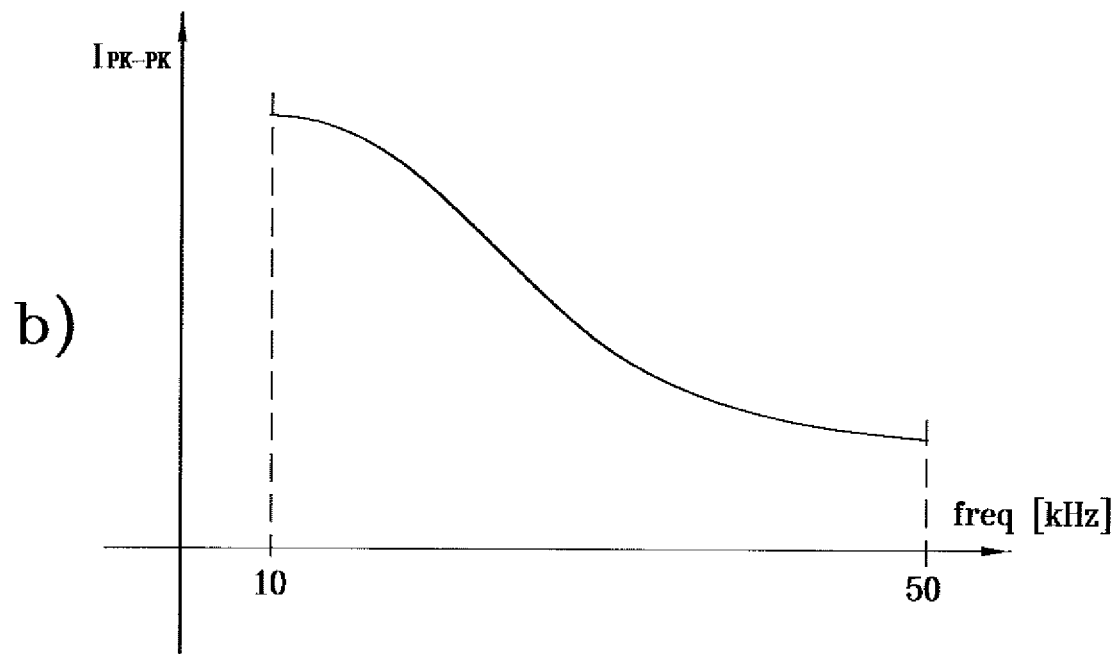

ELECTRONIC IGNITION SYSTEM FOR AN INTERNAL COMBUSTION ENGINE AND CONTROL METHOD FOR SAID ELECTRONIC IGNITION SYSTEM

The present invention relates to an electronic ignition system for an internal combustion engine and a control method for said electronic ignition system.

The internal combustion engines are macroscopically divided into spontaneous ignition engines and controlled ignition engines, the latter operating by compression of a mixture of air and fuel and contextual generation of a spark which, by igniting said mixture, generates a controlled explosion within one or more internal combustion chambers inside the engine so as to provide power to the same engine. The spark is typically generated by providing a high-voltage power to a spark plug presenting a specific distance between the electrodes, known as discharge "gap". Subsequent discharge triggers the combustion of the mixture.

In recent years, several solutions have been studied in order to maximize the efficiency of such combustion by controlling electronically the generation of the spark to modulate the behaviour of the spark plug according to the conditions of the engine and thus decreasing the presence of unburnt matter.

Such approaches mainly involve inducing a plasma state in the gas mixture inside the combustion chamber, i.e. ionizing the mixture/gas and thus making it a good electrical conductor strongly responding to the electromagnetic fields.

Therefore, plasma generation within a combustion chamber of an internal combustion engine, precisely for the features mentioned herein, ensures an improvement of the combustion of the mixture. In fact, the flame face generated by plasma during its propagation within the combustion chamber yields greatly elevated temperatures in the gas mixture, thus allowing the rapid spread of the same flame face with the reduction of the time required to its advancement, greatly enhancing the performance and reducing the presence of unburnt gases.

By way of example, document WO2012/106807 shows an ignition device as known by the state of the art.

Such a device comprises a coil with two windings, a primary one connected to a power generator and closed to the ground, and a secondary one connected to the spark plug, i.e. at the two electrodes.

The primary winding is further provided with an electronically controllable switch by means of a control unit, which drives its opening and closing according to a control signal received by the engine control unit (ECU).

The operation of what illustrated in WO2012/106807 comprises substantially four steps.

In a first step, the switch is closed by the control unit, and the current generated by the generator begins to flow in the primary winding, charging it to a desired current value.

During the second step, known as fly-back step, the switch is opened by the control unit, stopping to perform; by electromagnetic induction, the primary winding discharges on the secondary, charging it at a voltage, which is high enough to break the dielectric in the "gap" between the two electrodes, generating the spark.

In the third step, known as forward step, the switch is closed again by the control unit and starts to perform again by "charging" the primary winding and simultaneously by transferring power through the coil to the secondary winding, generating again a high voltage of opposite sign from the previous one, thus keeping the spark in the "gap" "alive".

It is known that the high voltage on the secondary winding, in this case, depends on the turn ratio between the two windings.

During the fourth step, the switch is closed again (new fly-back), heating the primary winding and re-establishing, by electromagnetic induction, an opposite sign voltage at the ends of the "gap" maintaining the spark.

It is known that what is commonly known as the "plasma step" is mainly defined by repeating the third and fourth step, wherein the number of repetitions determines the duration of the spark and thus the completion of combustion.

In other words, the voltage alternating command ensures the flow of electrons through the discharge "gap" such that the effect of avalanche ionization occurs.

However, the known devices, including the one shown in the document just described, have many drawbacks, linked to both performance and reliability factors.

A first drawback of this technology is related to the need for increasing the turn ratio between the two windings (in favour of the secondary) to enable the efficiency of the forward steps.

Such need, along with the fact that the switching rate between the open and closed configurations of the switch, contributes to generate on the secondary winding, and thus at the ends of the spark plug, a high voltage peak for each closing of the switch.

This peak, if not limited, would be sufficient to break the dielectric in the gap, resulting in a dangerous advance spark of the cylinder.

A further criticality of the known devices is linked to the difficulty of controlling the switch during the "plasma" step; such difficulty results in a poor accuracy in the management of the opening and closing of the switch, often controlled by predefined logic, without taking into account the real conditions which are created in the cylinder, thus on the secondary winding.

Again, one of the problems more often found in the known devices is due to power dissipation that, by controlling the secondary winding in alternate current, leads to perform a succession of openings and closings of the switch at high frequencies with consequent absorptions and dissipations by the same.

The object of the present invention is to provide an electronic ignition system for an internal combustion engine and a control method for said electronic ignition system, which are capable of obviating the drawbacks of the prior, art mentioned above.

Particularly, the object of the present invention is to provide an electronic ignition system for an internal combustion engine and a control method for said electronic ignition system, which are highly performing, but at the same time simple and cost-effective to implement.

A further object of the present invention is to provide an electronic ignition system for an internal combustion engine and a control method for said electronic ignition system, which allow to eliminate the issue of the advance spark.

In addition, it is an object of the present invention to provide an electronic ignition system for an internal combustion engine which is can be easily driven both in the fly-back and in the forward steps.

Again, an object of the present invention is to provide an electronic ignition system for an internal combustion engine, which limits to the greatest extent the thermal-power dissipations with increased reliability.

Said objects are achieved by an electronic ignition system for an internal combustion engine having the features of one or more of the appended claims from 1 to 11, as well as by a driving method having the features of one or more of the appended claims from 12 to 17.

In particular, these objects are achieved by an electronic ignition system for an internal combustion engine, configured to generate a spark of a predetermined duration within an engine cylinder, comprising an ignition coil having at least one primary winding and one secondary winding, wherein said at least primary winding may be connected, by means of an electrical connection, to a voltage generation device and said secondary winding can be connected to a spark plug, a switch connected to said primary winding and drivable in open and/or closed position according to the value of a command signal, so as to prevent or to allow a current passage through said primary winding, respectively, a control unit associated to said primary winding and configured to drive it in open and/or closed position according to the value of said control signal.

According to a first aspect of the present invention, the system includes a voltage changing element, connected to said electrical connection, operatively interposed between the electrical connection and the primary winding and configured to change the voltage value of said primary winding according to the value of a control signal, wherein the control unit is associated to the changing element and configured to generate said variable control signal at least between a first value and a second value, representing respectively a first and a second voltage value of the primary winding, wherein said value is greater than the first.

The control unit is further configured to send to said changing element said control signal having said first value at least during a first charging interval of the primary winding, wherein said switch is closed and in said secondary winding the current value has a substantially null mean value.

Advantageously, in this manner, during the first step of charging of the primary winding, it is possible to minimize the multiplying effect, on the second winding, of the turn ratio between the two windings.

In other words, thanks to this solution, it is possible to ensure the start of the spark during the first fly-back step, allowing in any case to keep an efficient "plasma" control (third and fourth steps) in which the power voltage is again increased by the changing module making the most of the turn ratio.

According to a further aspect of the present invention, the system comprises current detection means associated with said secondary winding; the control unit is associated with detection means for receiving a signal representative of at least a current value in the secondary winding, and configured to drive said switch according to said signal.

More precisely, the control unit is configured to modulate the switch driving signal according to said current signal detected on the secondary winding.

Preferably, the control unit is associated with the detection means for receiving a signal representative of at least one current value in the secondary winding in at least a preset time, programmed to process said signal by correlating it to one or more parameters of switch control configured to compare said one or more control parameters with one or more of the respective preset reference values and send to said control module one or more operational signals of a value determined according to said comparison.

Thus, advantageously, switch driving (preferably in PWM modulation) is done according to a closed-ring control of current on the secondary winding in the previous cycle, optimizing the response and increasing control accuracy.

In accordance with a further aspect of the invention, the system includes an accumulation circuit connected in parallel to said switch and configured to build up residual power remaining in the primary winding a result of the opening of said switch.

It is noted that, as used herein, the expression "residual power" is defined as the power stored in the dispersed inductance of the primary winding, and thus is not transferred to the secondary winding by electromagnetic induction.

Preferably, the accumulation circuit is configured to absorb current from the primary winding or to discharge current on said primary winding according to the charging condition of the primary winding itself.

Advantageously, in this way, for each opening of the switch, the residual current flowing from the primary winding is accumulated in the accumulation circuit and successively discharged back on the primary winding with no thermal dissipation and completely freeing the switch from the burden of managing these charges.

These and other features will become more apparent from the following exemplary, and therefore non-limiting description, of a preferred, and therefore not exclusive, embodiment of an electronic ignition system for an internal combustion engine and a control method for said electronic ignition system as shown in the following drawing tables, wherein.

Figure 1:
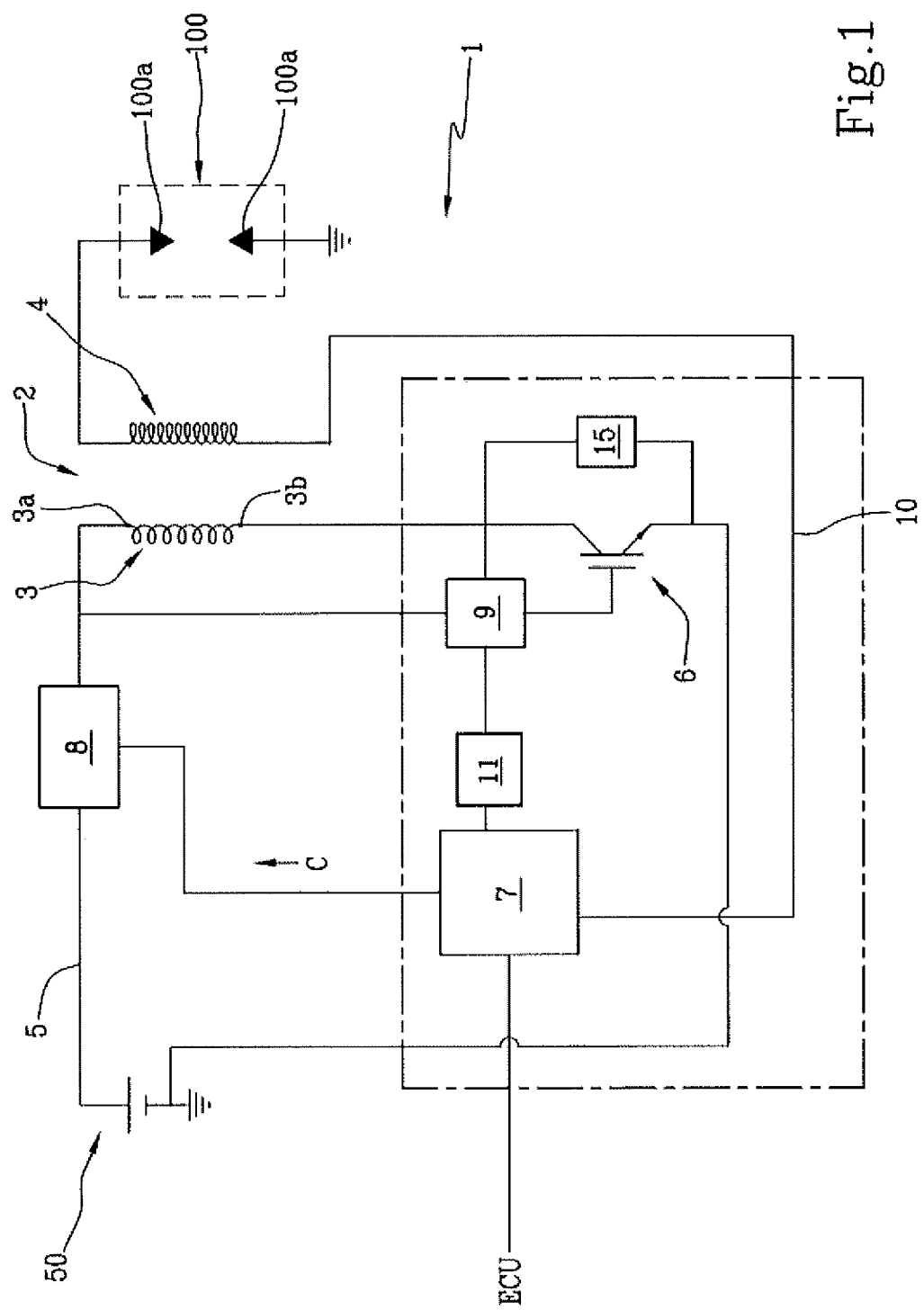
FIG. 1 shows a schematic-functional view of an electronic ignition system for an internal combustion engine according to the present invention.
Figure 2:
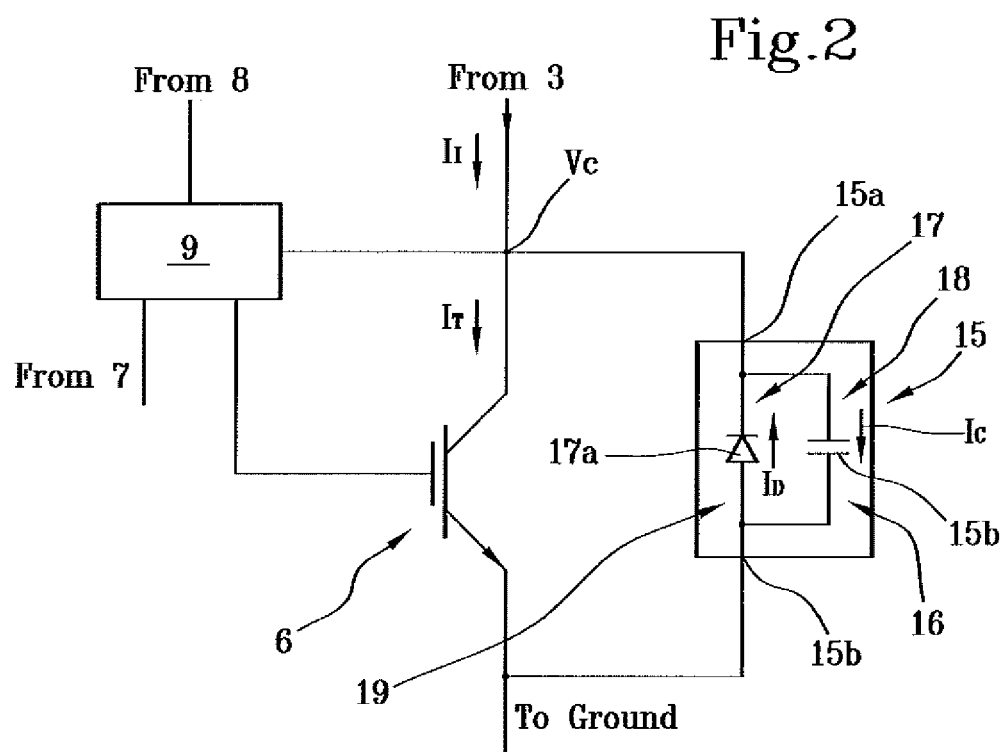
FIG. 2 shows a schematic-functional view of a component of the system of FIG. 1.
Figure 3:
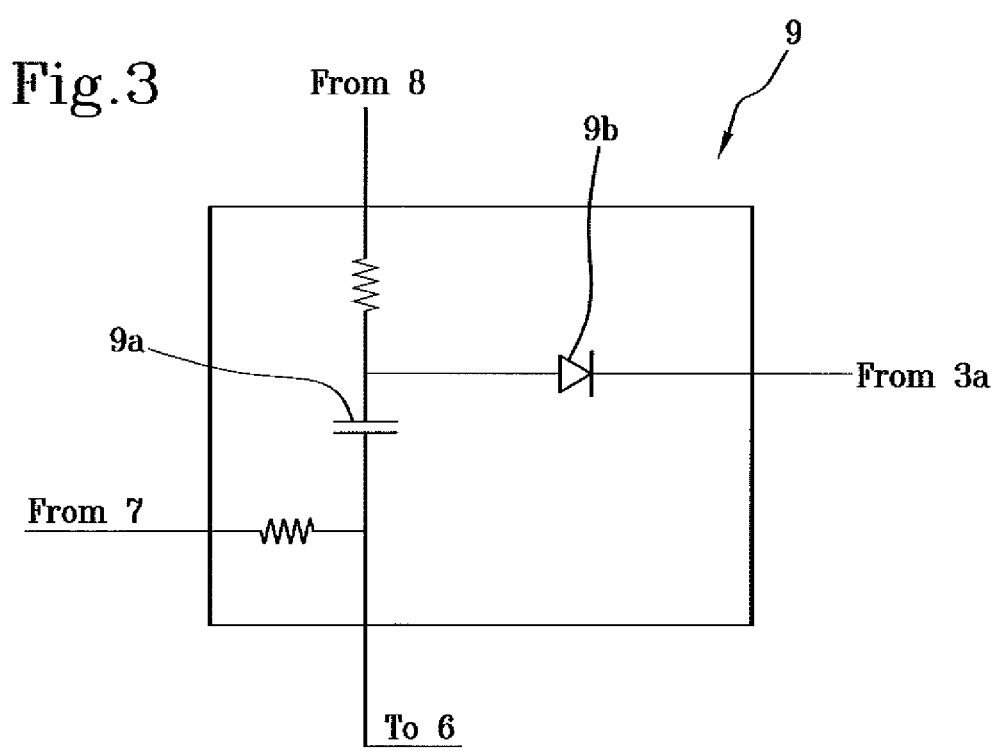
FIG. 3 shows a schematic-functional view of an additional functional component of the system of FIG. 1.
Figure 4:
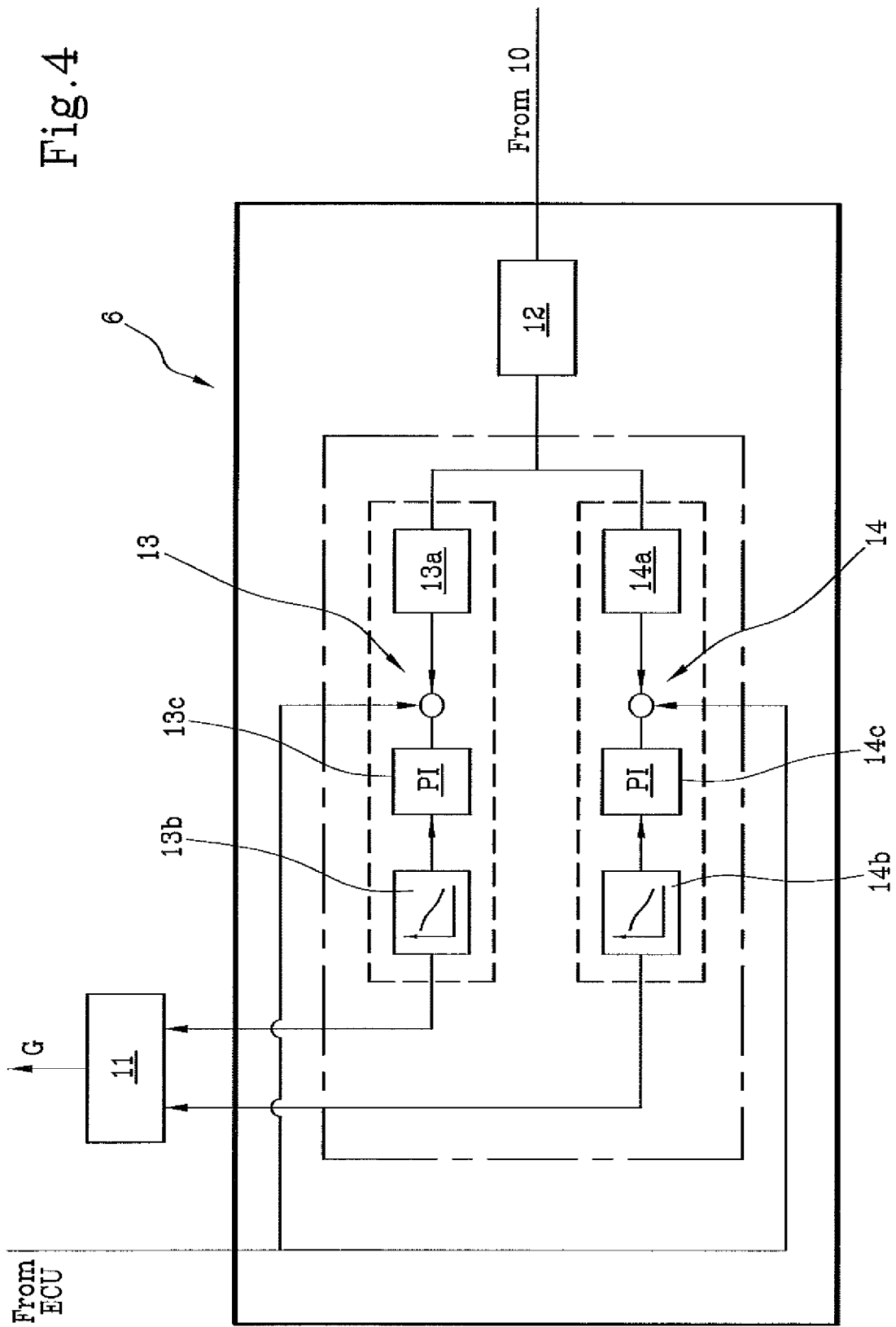
FIG. 4 shows a schematic-functional view of the control unit of the system of FIG. 1.
Figure 5:
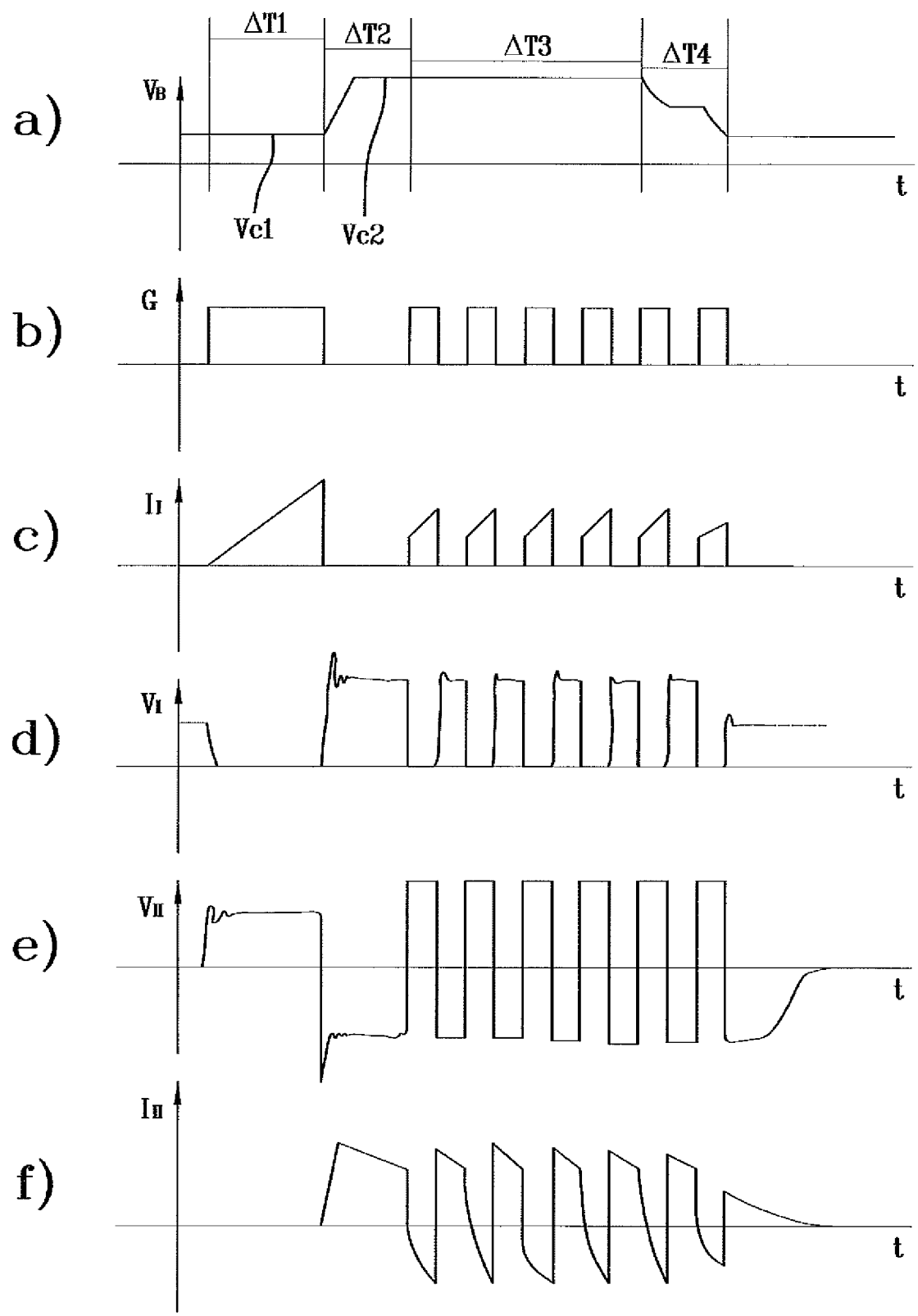
Figure 7:
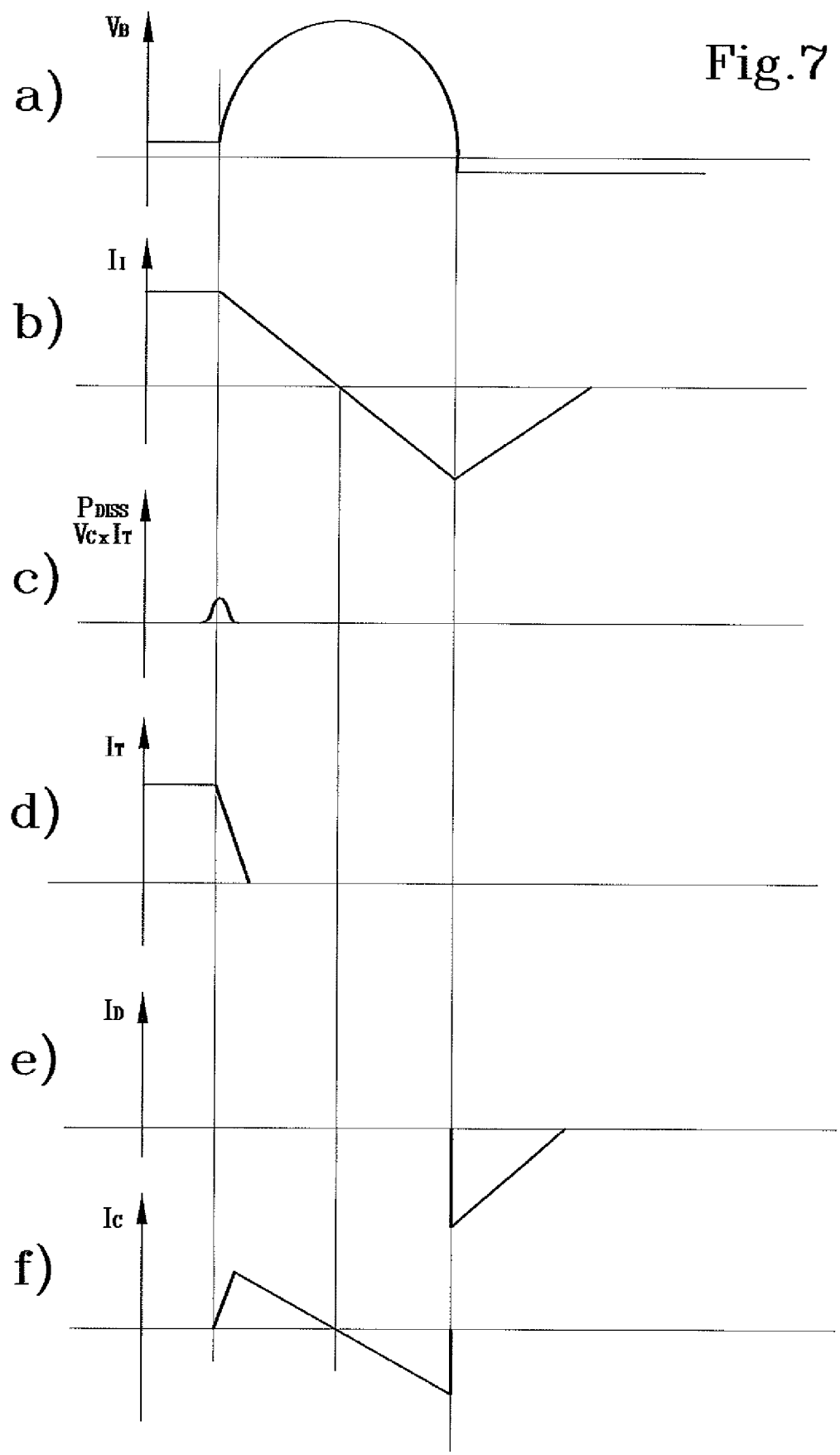

FIGS. 5*a*-5*f* show the current, voltage and control signal trends of the components of the system of FIG. 1;

FIGS. 6*a* and 6*b* show the correlation between the current on the secondary winding and the control parameters of the switch of the system of FIG. 1;

FIGS. 7*a*-7*f* show the trends of the current and voltage signals in various branches of the switch and of the accumulation module during the switch opening step.

With reference to the accompanying figures, number 1 is referred to an ignition system for an internal combustion device according to the present invention.

The ignition system 1 is thus a device or device assembly configured to generate a spark within each cylinder of the internal combustion engine, providing the two electrodes 100*a* of the spark plug 100 the voltage required to break the dielectric, allowing the generation of a current flow. System 1 is therefore associated to (or includes) a voltage (or current) generator device 50, preferably at the vehicle's battery.

In the preferred embodiment, the generator 50 is therefore configured for providing a direct current to the system 1.

More precisely, the generator is a battery, more preferably a battery for motor vehicles, even more preferably a lead-acid battery.

The system further comprises at least one ignition coil 2 having at least one primary winding 3 and one secondary winding 3.

More precisely, the system includes a plurality of coils 2, each associated with a respective cylinder of the engine.

The primary winding 3, which is provided with a first terminal 3a and a second terminal 3b, may be connected, by means of an electrical connection 5, to the voltage generator device 50.

The secondary winding 4 is instead connectable (or connected) to the spark plug 100.

Note that the primary winding 3 comprises a first number of turns $N_I$, while the secondary winding 4 comprises a second number of turns $N_{II}$.

Preferably, the secondary winding 4 has a number of turns higher than the primary winding 3 to increase the voltage on the secondary winding 4 (which is precisely part of the high voltage circuit).

In the preferred embodiments, the turn ratio equal to the second number of turns $N_{II}$ divided by the first number of turns $N_I$, is comprised between 120 and 220 and preferably equal to about 150.

The system 1 further comprises a switch 6, also connected to the primary winding 3 and drivable in open and/or closed position in order to prevent or allow a current flow through said primary winding 3, respectively.

In the preferred embodiment, the primary winding 3 is interposed between the electrical connection 5 and the switch 6.

Thus, preferably, the switch 6 is connected to the second terminal 3b of the primary winding 3.

Preferably, the switch 6 is of static type; more preferably, to allow an efficient and reliable management of the involved charges, the switch 6 is an isolated gate bipolar transistor (commonly known as IGBT).

This switch 6 has, therefore:
a first node, or connector, connected to the primary winding 3,
a second node, or emitter, connected to the ground, and
a third node, or gate, controllable to allow the opening or closing of the switch 6 itself.

In this view, the system comprises a control unit 7 associated with said switch 6 and configured to drive it to an open and/or closed position according to the value of a preset driving signal.

Therefore, the control unit 7 is configured to modulate (or generate) the driving signal of switch 6.

More precisely, the control unit 7 is configured to generate a driving signal for a driving module 11 of switch 6.

Thus, the third node (or gate) is operatively, and preferably electrically, connected to the control unit 7.

The control unit 7, or peripheral power unit, is also connected or connectable to an electronic control unit "ECU" of the vehicle.

More precisely, the control unit 7 is arranged to receive from the ECU one or more signals representative of the operating conditions of the engine and is configured to drive the switch 6 (that is to control the driving unit 11) according to said one or more signals.

The correlation between the control unit 7 and the ECU will not be discussed in detail as it is known per se and variable according to vehicle models and configurations.

In any case, the system 1 according to the present invention is of the "plasma" type, i.e. Is configured to drive the coil 2 so that each work cycle, i.e. each combustion of each cylinder, is divided into a plurality of subsequent and partly defined time intervals.

More precisely, the work cycle comprises at least one first, second, third gap in succession to each other, respectively corresponding to a first, second and third mode of the control unit 7.

In other words, the control unit 7 is configured to switch to said first, second and third mode, respectively for a first, a second and a third interval, in succession to each other.

Therefore, the control unit 7 can be switched to a number of modes, each corresponding to an interval of the work cycle.

Preferably, the control unit 7 is programmed to switch between at least:
a first mode wherein it drives (through the driving module 11) in closed position said switch 6 for a preset first period of time, so as to effect a first charging of the primary winding 3;
a second mode, which defines a first fly-back step, wherein it drives (through the driving module 11) in open position said switch 6 for a preset second time interval to enable the discharge of the primary winding 3 and the consequent generation of high voltage on the secondary winding 4 (which breaks the dielectric at the ends of the spark plug 100);
a third mode, or "plasma configuration", in which it drives in alternating sequence at least one opening and at least one closing of said switch 6.

More precisely, in such third mode, the control unit 7 is programmed to determine the duration of the opening and closing intervals of the switch 6 and/or the number of openings and subsequent closings for a desired duration of the spark (i.e. of the plasma step).

In other words, the control unit 7 is configured to determine a predetermined duration of the spark according to one or more operating parameters of the engine by modulating the number of openings and closings (or the respective durations) of the switch 6 in the third mode.

In accordance to the already briefly discussed, the control unit 7 is therefore configured to modulate the switch driving signal (by the driving module 11) according to one or more operational parameters of the engine.

According to a first aspect of the present invention, the system 1 comprises a an voltage changing electronic element 8 connected to the electrical connection 5 and operatively interposed between the electrical connection 5 and the primary winding 3.

In other words, the changing electronic element 8 is positioned upstream of the primary winding 3, in electrical connection with it.

Such changing electronic element 8 is configured to change the voltage value of the primary winding 3 (in particular at the first terminal 3a) according to the value of a control signal "C" of at least a first voltage value V1 and a second voltage value V2.

Note that the second voltage value V2 is greater than the first voltage value V1.

Such changing module 8 is intended to define the value of the voltage on the primary winding 3, i.e. the voltage supply of the same as the switch 6 is closed.

Thus, the changing electronic element 8 is configured to divide the power voltage of the primary winding 3, i.e., the voltage generated by the generating device 50, according to a control signal received by the control unit 7.

In the preferred embodiment, the changing electronic element is a D/D voltage converter, preferably of the buck or boost type, depending on whether it is configured to reduce or to increase the power voltage.

Alternatively, the changing electronic element 8 may be a buck/boost converter, i.e. a converter capable of both reducing voltage in the first charging step and of increasing it in the plasma step.

It is to be noted that such a converter, regardless of the type, may be either isolated (also including a transformer) or not isolated. Therefore, the control unit 7 is preferably associated with the changing electronic element 8 in order to drive it.

More precisely, the control unit 7 is configured to generate a control signal "C", variable at least between a first value and a second value, respectively representative of the first voltage value "V1" and of the second voltage value "V2" of the primary winding 3.

Furthermore, the control unit 7 is further configured to send to said changing electronic element 8 said control signal "C" having said first value at least during a first charging interval of the primary winding 3, wherein said switch 6 is closed and in said secondary winding 4 the current value has a substantially null mean value.

In other words, the control unit 7 is programmed to send to the changing electronic element 8 the first value of the control signal "C" when it is in the first mode.

Furthermore, the control unit 7 is further configured to send to said changing electronic element 8 said control signal "C" having said second value in a time interval during which voltage on said secondary winding 4 has a value different from zero.

Therefore, the control unit 8 is programmed to send to the changing electronic element 8 the second value of the control signal "C" when it is in the second and/or third mode.

As a consequence, the control unit 7 is programmed to switch between at least:
- the first mode, in which it sends to the changing electronic element 8 the first signal S1 and drives (through the driving module 11) the switch 6 in closed position;
- the second mode, in which it drives (through the driving module 11) said switch 6 in open position and sends the changing electronic element 8 the second signal S2;
- the third configuration, in which it drives (through the driving module 11) in alternating sequence at least one closing and at least one opening of the switch 6.

Advantageously, in this way, it is possible to reduce the voltage on the secondary winding 4 during the first period of the work cycle, i.e. during the first charging of the primary winding 3, avoiding dangerous advances in the generation of the spark.

Note that, in the third mode, the control unit 7 is configured to maintain the voltage value of electrical connection 5 equal to the second value.

Advantageously, in this way the highest voltage on the primary winding 3, together with a favourable turn ratio between the two windings, allows to maintain also during the third interval, or during the plasma step, such voltage on the secondary winding 4 so as to keep the spark "alive".

In this respect, preferably, the changing electronic element 8 of the primary and secondary windings 3 and 4 are configured such that:

$$V_{batt}*(1-\mu_{var})*(N_{II}/N_{I}) < 1000 \text{ V}$$

Where:
- $V_{batt}$ is the voltage of the voltage generator 50, i.e. the voltage in correspondence to the electrical connection 5;
- $\mu_{var}$ is the voltage percentage variation imparted by the changing electronic element 8, that is the percentage or relative difference between the first and the second value;
- $N_I$ is the number of turns of the primary winding 3;
- $N_{II}$ is the number of turns of the secondary winding 4.

Preferably, it is further noted that the control unit 7 also has a fourth discharge configuration.

Such fourth configuration corresponds to a fourth and last interval of the work cycle, wherein the system is discharged and the spark quenched.

In such a fourth mode, the control unit 7 continues to drive the switch 6 with an alternate succession of at least one opening and at least one closing, by sending simultaneously the changing electronic element 8 the first value of the control signal "C" to reduce voltage to said first value V1.

Advantageously, in this way, it is possible to discharge also the internal capacitor of the changing electronic element 8, present for example in the preferably used buck or boost converter.

In the preferred embodiment, it is known that the system includes a single changing electronic element 8, operatively connected to each coil 2.

Alternatively, however, a "stand-alone" system may be provided, wherein each coil 2 is associated to its dedicated changing electronic element 8.

Preferably, in order to reduce the voltage peak on the secondary winding at the start-up time of the first interval, that is when the control unit 7 switches to the first mode, the system 1 comprises a limiting device 9 associated to the switch 6 and configured to slow down the effect of a closing of the same switch 6 on the primary winding 4.

More precisely, in a preferred embodiment, the limiting device 9 includes a capacitor 9a and a diode 9b.

Initially, when the switch 6 is open, the capacitor 9a is charged to the power voltage and the diode 9b is cut off because the same voltage on 9a is applied to the collector terminal of the IGBT.

When the switch 6 is closed, the signal from the driving block changes from low, about 0 V, to high, greater than 4 V.

Such voltage (high, e.g. 4 V) is applied to the gate terminal (or third node) of switch 6 through a resistor, which starts the transitional passage from cut-off to conduction.

To change from the IGBT cut-off step to the IGBT conduction step in this step, the voltage on the collector of switch 6 (IGBT) begins to drop, bringing diode 9b into conduction.

In this manner, through the capacitor 9a, current is taken from the third node of the switch 6 in a manner proportional to the ramp-down of the voltage on the first node of the switch 6.

This causes an instant decrease of the voltage on the third node, also proportional to the ramp-down slope of the first node voltage.

Since the ramp-down slope of voltage on the first node is closely related to the voltage on the third node, the system finds a balance.

Increasing the capacity value of the capacitor 9a leads to a further reduction of the ramp slope.

Low slope values prevent the initiation of oscillation on the transformer that lead to an overvoltage on the secondary winding during the above transient state.

According to a further aspect of the present invention, complementary to the above, the system 1 comprises detection means 10 of the current associated to the secondary winding 4.

The control unit 7 is associated with such detection means 10 for receiving a signal representative of at least one current value in the secondary winding 4 and is configured to drive the switch 6 (through the driving module 11) according to said signal.

It is known that the third gap is defined by a number of plasma cycles (hereinafter simply "cycles"), each split into a first interval, or opening interval of the switch 6, and a second interval, or closing interval of the switch 6.

Therefore, the control unit 7 is configured to detect a signal representative of at least one current value of the secondary winding 4 at the previous cycle and to drive the switch 6 for the detection of the next cycle.

Advantageously, in this way, the modulation of the plasma step (third interval) is particularly accurate and precise, limiting to the greatest extent, if not eliminating, the presence of unburnt matter.

Note that the control unit 7 is configured to control, through the driving module 11, the switch 6 according to the current signal "$I_{II}$" detected on the secondary winding 4 by detection means 10 when it is in the third mode.

In other words, in the third interval of the work cycle (i.e., the plasma step) the control unit 7 is configured to control the switch 6, and thus the primary winding 3, according to the current flowing on the secondary winding 4.

Preferably, the control unit 7 is associated to said detection means 10 for receiving a signal "$I_{II}$" representative of at least one current value in the secondary winding 4 in at least one preset time.

The control unit 7 is thus programmed to compare at least one value representative of such detected signal "$I_{II}$" to one or more preset reference values to send a driving module 11 one or more operating signals with preset value according to said comparison.

Preferably, the control unit 7 is programmed to process the detected current signal "$I_{II}$" or the result of comparison by correlating it to one or more driving parameters of the switch 6.

The expression "driving parameters" means, in the present context, defining, preferably, those variables that can be controlled to drive switch 6.

According to the type of driving, the parameters may be different.

For example, in the preferred embodiment, the driving module 11 includes at least a PWM signal generator.

In this view, preferably the driving parameters include at least the duty cycle and/or a frequency of the PWM driving signal sent by the driving module 11 to the switch 6, preferably configured to drive a succession of work cycles at the driving module 11, each divided into an opening interval and a closing interval of the switch 6.

More precisely, the control unit 7 is configured to perform said detection and comparison at least when found in the third mode (i.e. during the third interval of the work cycle).

In other words, the control unit 7 is configured to control, through the driving module 11, the switch 6 according to a current signal "$I_{II}$" detected on the secondary winding 4 by detection means 10 when it is in the third mode.

Furthermore, the control unit 7 also includes a controller module 13 configured for:

detecting and/or calculating at least a current value representative of a mean current value during a previous cycle (or plasma cycle);

comparing said representative value with a preset reference value of said mean value;

calculating, according to said comparison, a change in the duty cycle of the driving signal;

sending to said driving module 11 a signal related to said change of the duty cycle.

Note that the calculation of the duty cycle can be made by the control unit 7 either as a variation of the duty cycle between the previous cycle and the following one or in terms of absolute duration (percentage).

It is noted that, in the preferred embodiment, the preset reference value of the mean value is substantially equal to zero.

Preferably, the control unit 7 comprises at least one sampling module 12, operatively interposed between the detection means 10 and the controller module 13.

Such sampling module 12 is associated with the detection means 10 and configured to sample an identifying current value for each closing and opening interval of the switch 6 in each cycle or plasma cycle.

Thus, for each cycle, the sampling module 12 is configured to sample, i.e. detect, two current values, a first current value identifying the closing interval and a second current value identifying the opening interval.

Preferably, the first value and the second value are mean values of the current in each interval.

More precisely, the first and the second value are mean values, from the time and/or quantity point of view, of the positive (first interval) and negative (second interval) half-wave, which represents the mean value with negligible error.

Therefore, preferably, the controller module 13 includes a computer 13a adapted to receive at least the first and the second current value and programmed to sum said first value and said second value so as to obtain the representative value of a mean current value in the previous cycle.

Additionally, the controller module 13 comprises an adjuster 13b (preferably proportional-integral) programmed to determine the value of the duty cycle according to the comparison between the representative value of the mean value and the preset reference value.

More precisely, the controller 13b is configured to "multiply" the calculated error according to the proportional and integral coefficients; in a position operatively downstream of the adjuster there is also a transformer module 13c, configured to transform the output value of the adjuster into a duty cycle value.

Alternatively, preferably jointly, the control unit comprises an additional controller module 14.

Such additional controller module 14 is operatively placed downstream of the sampling module 12 to receive the first and the second current value.

Such further controller module 14, during each cycle, is configured for:

detecting and/or calculating at least a current value representative of a current amplitude during a previous cycle;

comparing said representative value with a preset reference value of said amplitude;

calculating, according to said comparison, a change in the frequency of the driving signal;

sending to said driving module 11 a signal related to said change of frequency.

Note that the calculation of the frequency can be made by the control unit 7 either as a variation of the signal frequency between the previous cycle and the following one or in absolute terms.

Preferably, the preset reference value of the amplitude is comprised between 10 mA and 200 mA, preferably between 20 mA and 150 mA.

The additional controller module 14 preferably includes at least a computer 14a adapted to receive at least the first and the second current value and programmed to calculate the difference between said first value and said second value so as to obtain said representative value of a current amplitude in the previous cycle.

Furthermore, the additional controller module 14 comprises an adjuster 14b (preferably proportional-integral) programmed to determine the value of the frequency according to the comparison between the representative value of the amplitude and the preset reference value.

More precisely, the adjuster 14b is configured to "multiply" the calculated error according to the proportional and integral coefficients; in a position operatively downstream of the adjuster there is also a transformer module 14c configured to transform the output value of the adjuster into a frequency value.

In accordance with a further aspect of the invention, preferably complementary to both the already discussed aspects, the system 1 includes an accumulation circuit 15 connected in parallel to said switch 6 and configured to build up residual power remaining in the primary winding 3 a result of the opening of said switch 6.

Advantageously, in this way, it is possible to maximize the reduction of power dissipations, thus avoiding the overheating of switch 6.

Preferably, the accumulation circuit 15 is configured to absorb current from the primary winding 3 and/or to discharge current on said primary winding 3 according to the charging condition of the primary winding 3 itself.

More precisely, the accumulation circuit 15 has an accumulation condition, wherein it charges up to a maximum value with a residual current flowing into the primary winding 3 (that is, from the primary winding 3) following said opening of the switch 6.

Additionally, the accumulation circuit 15 has a discharge condition, wherein the residual current accumulated is discharged on the primary winding 3 in the opposite direction with respect to the charging condition.

Such accumulation circuit 15 is thus configured to switch between the two configurations according to the charging condition of the primary winding 3.

In this view, the accumulation circuit 15 comprises at least one accumulation half-part 16 and a discharging half-part 17 placed operatively parallel with each other.

With reference to the schematically illustrated embodiment, the accumulation circuit 15 comprises a first branch 18 and a second branch 19 placed operatively in parallel and both developing from a first node 15a and a second node 15b.

The switch 6 is connected in parallel to the accumulation circuit 15 in correspondence to said first node 15a and second node 15b.

The first branch 18 preferably comprises a capacitor 16a.

Thus, the accumulation half-part 16 is defined by at least one capacitor 16a placed in parallel with said switch 6.

In detail, the capacitor 16 must have a capacity such as to store the inductance power dispersed in the primary winding, preferably comprised between 40 nF and 100 nF.

Moreover, such capacitor 16 must be structured so as to be able to sustain a voltage higher than the clamp voltage of switch 6, preferably comprised between 300 V and 600 V.

On the other hand, the second branch 19 comprises a diode 17a arranged so as to allow a unidirectional current passage of the second node 15b towards the first node 15a.

In detail, the diode 17a is configured to sustain a reverse voltage higher than that of the switch clamp (between 300 V and 600 V).

In addition, the diode 17a is configured to support a current peak corresponding to the maximum current of the primary winding 3 (i.e., at least 50 A).

In other words, the first branch 18 defines the accumulation half-part 16 and the second branch 19 defines the discharge half-part 17 of the accumulation device 15.

As mentioned earlier, also the driving method of the system 1 is object of the present invention.

The method according to the present invention is therefore focused on the driving of an electronic ignition system for an internal combustion engine comprising an ignition coil 2 provided with at least one primary winding 3 and one secondary winding 4, wherein said secondary winding 4 is connected to spark plug 100.

Such system 1, already thoroughly described earlier, further comprises a switch 6, connected to the primary winding 3 and drivable in its opening and/or closure in order to prevent or to allow, respectively, a current flow through the same.

Note that the driving method is configured to provide a "plasma" driving of the coil 2, that is determining, for each work cycle, a sequence of a first, a second and a third step.

In the first step, the primary winding 3 is charged by closing the switch 6 for a first time interval.

In the second step, the secondary winding 4 is powered by electromagnetic induction after an opening of at least a second time interval (prolonged) of the switch 6; such opening sufficiently long to allow to the current on the primary winding 3 to go to zero.

Note that in this second step, the secondary winding voltage reaches a value such as to break the dielectric between the two electrodes of the spark plug 100, generating the spark.

The third step, or plasma cycle, or plasma step, involves an alternate succession of closing and opening of said switch 6 (shorter than the previous ones) so as to modulate spark duration.

According to one aspect of the present invention, a preset first value of power voltage for primary winding 3 is initially set at each cycle.

Such value is maintained during said first step so as to reduce the voltage on the secondary winding 4 during the first period of the work cycle, i.e. during the first charging of the primary winding 3, avoiding dangerous advances in the generation of the spark.

Such method also comprises a step of increasing said power voltage of the primary winding (3) to a second value, greater than the first value, during said power step for the secondary winding 4, that is during the second or third step.

Note that said second voltage value is maintained during the third step.

In other words, for at least a first part of said alternating sequence of openings and closures of said switch 6, the power voltage of the primary winding 3 is maintained equal to said second value.

Advantageously, in this way, it is possible to make the most of the turn ratio between the two windings during the plasma step.

The method involves, at each cycle, also a fourth step in which there is a new setting of said first preset voltage value for primary winding 3.

Such fourth step preferably starts after or during a final portion of said alternating succession of closings and openings of the switch 6 (that is at the end of the third step).

Preferably, in agreement with the previously described in relation to the system 1, the setting and increasing steps are carried out by a suitable changing module 8.

in the preferred embodiment, the new setting step mentioned above is carried out during a final part of said alternate succession of closings and openings of the switch

6 so as to discharge power accumulated in said changing module 8 during the power step and the subsequent alternate succession of closings and openings of the switch 6 (that is during the second and third steps).

Preferably, moreover, the step of charging the primary winding 3 comprises at least a sub-step of reduction of the voltage (and/or the flow of current from the switch 6) to the primary winding 3 in order to reduce the voltage surge on said secondary winding 4 during said charging step (that is during the first step).

More precisely, such sub-step is expected to reduce the voltage at the ends of the primary winding, so as to slow down the current increase (of the current flow).

Note that, during the third step, that is during the plasma step, at least one closing of the switch 6 for a preset time interval and a subsequent opening of said switch 6 for a preset second time interval occur.

Such first and second time intervals, as already mentioned above, define the plasma cycle.

According to a further aspect of the present invention, the method comprises detecting at least one current value in the secondary winding 4 during the first and the second interval, and calculating one or more driving parameters of the switch 6, in a next cycle, according to said current detected in the secondary winding 4.

In other words, the method involves driving the switch in each cycle of the plasma step according to current detected in the secondary winding 4 in a previous cycle, preferably immediately preceding.

More precisely, the method involves processing said at least one current value and comparing said processed value with a respective reference value.

Driving the switch 6 according to a result of said comparison is also provided.

As already mentioned, the driving of switch 6 is preferably carried out with PWM modulation.

In this view, the driving parameters are preferably defined by a duty cycle and by a driving signal frequency.

Preferably, detection of the current signal on the secondary winding 4 comprises at least a sampling step of a first current value identifying the first interval and a second current value identifying the second interval.

More preferably, such identification values correspond to an average value of the current in each interval, even more preferably to a current value at about half of the interval.

Note that the calculation step preferably comprises at least a sum of the first value with the second value to obtain a value representative of a mean value of the current in said work cycle.

In fact, the plasma cycle being performed with alternate current driving, the two opening and closing intervals are of opposite sign current and the sum of the two identification values is correlated (or proportional) to the mean value in the cycle.

Such sum is followed by comparing said value representative of the mean current value in said duty cycle to a reference value of the mean value, preferably equal to zero.

According to the result of said comparison, a duty cycle value of a driving signal of the switch 6 is determined, in relative terms (i.e. variation compared to the previous cycle) or in absolute terms.

This is possible by processing, through a suitable adjuster, the existing correlation between the mean current value in the secondary winding 4 and the duty cycle of the driving signal; an example of such correlation is represented in FIG. 6a.

Following the duty cycle determination, the switch 6 is driven with PWM modulation and duty cycle corresponding to said determined value.

Preferably, alternately or jointly to the determination of the duty cycle, the method involves calculating the difference between said first value and said second value to obtain a value representative of an amplitude of the current in said work cycle.

In fact, the plasma cycle being performed with alternate current driving, the two opening and closing intervals are of opposite sign current and the difference between the two identification values is correlated (or proportional) to the amplitude of current in the cycle, that is the peak-to-peak value.

Such subtraction operation is followed by comparing said value representative of the current amplitude in said work cycle (i.e., in the previous work cycle) with a baseline value of the amplitude the same.

Preferably, said reference value of the amplitude is comprised between 10 mA and 200 mA, preferably between 20 mA and 150 mA.

According to the result of said comparison, a frequency value of the driving signal of the switch 6 is determined, in relative terms (i.e. variation compared to the previous cycle) or in absolute terms.

This is possible by processing, through a suitable adjuster, the correlation existing between the mean current value in the secondary winding 4 and the frequency of the driving signal; an example of such correlation is represented in FIG. 6b.

As a result of frequency determination, the switch 6 is driven with PWM modulation and frequency corresponding to said determined value.

In the preferred embodiment, the switch 6 is driven with a driving signal in PWM modulation, having duty cycle and frequency corresponding to those determined in the aforementioned steps.

The invention achieves the intended objects and achieves important advantages.

In fact, the use of an electronic variation element, in particular a D/D voltage converter, allows to overcome the problem of spark advance, also allowing to make the most of the turn ratio in the plasma steps.

Furthermore, the possibility of controlling switch driving, at least during the plasma steps, as a function of actually measured current on the secondary winding, also allows to increase the accuracy and reliability of the system, thus minimizing the presence of unburnt matter.

Moreover, the presence of an accumulation circuit in parallel to the switch allows to limit thermal-power dissipation, reducing stress on the components, in particular on the switch, and thereby increasing the reliability of the system.

The invention claimed is:

1. An electronic ignition system for an internal combustion engine, configured to generate, within an engine cylinder, a spark of predetermined duration, the electronic ignition system comprising:
    an ignition coil provided with a primary winding and a secondary winding, wherein said primary winding is connectable, by an electrical connection, to a voltage generator device and wherein said secondary winding is connectable to a spark plug;
    a switch connected to said primary winding, wherein the switch is drivable to be opened and/or closed according to a value of a driving signal (G) generated by a PWM signal generator, in order to prevent or allow a passage of electric current through said primary winding, respectively;

a control unit associated with said switch via said PWM signal generator and configured to drive the switch through the PWM signal generator in a first mode, wherein the control unit drives said switch to a closed position for a preset first time interval, so as to carry out a first charging of the primary winding;

a second mode, wherein the control unit drives said switch to an open position for a preset second time interval to enable the discharge of the primary winding and the consequent reaching of high voltage on the secondary winding, which generates a spark at ends of a spark plug;

a third mode, in which the control unit drives the switch in a number of cycles each split into an opening and a closing interval of the switch so as to keep the spark alive, wherein in said third mode the control unit is programmed to determine a duration of each opening and closing interval of the switch in each cycle and a number of cycles so as to modulate a duration of said spark wherein, in each cycle of the third mode, said control unit is:

configured to receive a signal representative of at least a current value in the secondary winding at a preceding cycle;

programmed to carry out at least a first and a second comparison to compare said representative signal with at least two reference values;

determine at least a frequency of a PWM signal to be sent by said PWM signal generator to the switch according to a result of said first comparison;

determine at least a duty cycle of said PWM signal according to a result of said second comparison and configured to send, to said PWM signal generator, one or more operating signals representative of said frequency and said duty cycle of said PWM signal.

2. The electronic ignition system according to claim 1, wherein said control unit comprises a controller module that, in each cycle, is configured to:

detect and/or calculate at least a current value representative of a mean current value during a previous cycle in the secondary winding;

compare said current value with a reference value representative of a mean preset value;

calculate, according to said comparison, a change in the duty cycle of the driving signal (G); and send, to said PWM signal generator an operating signal related to said change of the duty cycle.

3. The electronic ignition system according to claim 2, wherein the controller module comprises at least a computer configured to:

receive at least a first current value corresponding to a value identifying the closing interval of said previous cycle;

receive at least a second current value corresponding to a value identifying the opening interval of said previous cycle;

sum said first value and said second value in order to obtain said value representative of a mean current value in the previous cycle.

4. The electronic ignition system according to claim 2, wherein said preset reference value of the average value is substantially equal to zero.

5. The electronic ignition system according to claim 1, wherein said control unit comprises a controller module that, in each cycle, is configured to:

detect and/or calculate at least a current value representative of a current amplitude during a previous cycle in the secondary winding;

compare said representative value with a preset reference value of said amplitude;

calculate, according to said comparison, a change in a frequency of the driving signal (G);

send to said PWM signal generator an operating signal related to said change in frequency.

6. The electronic ignition system according to claim 5, wherein the controller module comprises at least a computing module configured to:

receive at least a first current value corresponding to a value identifying the closing interval of said previous cycle;

receive at least a second current value corresponding to a value identifying the opening interval of said previous cycle;

calculate a difference between said first value and said second value in order to obtain said value representative of a current amplitude in the previous cycle.

7. The electronic ignition system according to claim 5, wherein said preset reference value ranges from 10 mA to 200 mA, or from 20 mA to 150 mA.

8. A method of driving an electronic ignition system for an internal combustion engine that includes an ignition coil provided with at least a primary winding and a secondary winding that is connectable to a spark plug, and a switch that is connected to said primary winding and that is drivable into an open position and/or a closed position in order to prevent or allow, respectively, a passage of current through said primary winding; said method comprising:

closing of the switch for a first time interval for charging the primary winding;

opening of the switch for a second time interval for powering the secondary winding by electromagnetic induction so that the secondary winding voltage reaches a value such as to generate a spark in the spark plug;

driving the switch by means of a PWM signal generator in a number of cycles each split into subsequent switch closing and opening intervals so as to keep the spark alive;

wherein, in each cycle, said driving step comprises:

detecting at least a current value in the secondary winding during said first and said second interval of a previous cycle;

carrying out at least a first and a second comparison to compare said current value at least two preset reference values;

calculating a frequency of a PWM signal to be sent by said PWM signal generator to the switch according to a result of said first comparison;

calculating least a duty cycle of the PWM signal to be sent by said PWM signal generator to the switch according to a result of said second comparison driving said switch according to a said PWM signal.

9. The method according to claim 8, wherein said calculating step comprises at least a sampling step of a first current value identifying the first interval, and a second current value identifying the second interval.

10. The method according to claim 9, wherein said calculating step comprises:
   summing said first value with said second value to obtain a value representative of a mean current value in said cycle;
   comparing said value representative of the mean current value in said cycle with a reference value of the mean value;
   determining a value of the duty cycle for said PWM signal (G) according to the result of said comparison;
   driving the switch by a PWM modulation having a duty cycle corresponding to said determined value.

11. The method according to claim 9, wherein said calculating step comprises:
   calculating the difference between said first value and said second value in order to obtain said value representative of a current amplitude in said cycle;
   comparing said representative value with a reference value of the current amplitude in said cycle;
   determining a value of the frequency for a PWM signal (G) of the switch according to the result of said comparison;
   driving the switch by a PWM modulation having a frequency corresponding to said determined value.

12. An electronic ignition system for an internal combustion engine, configured to generate, within an engine cylinder, a spark of predetermined duration, the electronic ignition system comprising:
   an ignition coil provided with a primary winding and a secondary winding, wherein said primary winding is connectable, by an electrical connection, to a voltage generator device and wherein said secondary winding is connectable to a spark plug;
   a switch connected to said primary winding, wherein the switch is drivable to be opened and/or closed according to a value of a driving signal (G) generated by a driving module, in order to prevent or allow a passage of electric current through said primary winding, respectively;
   a control unit associated with said switch via a driving module and configured to drive the switch through the driving module to an open position and/or a closed position according to the value of said driving signal (G), wherein the control unit is programmed to determine the duration of the opening and closing intervals of the switch and/or the number of subsequent openings and closings depending on a desired duration of the spark; and
   wherein the control unit is configured to receive a signal representative of at least a current value associated with a current in the secondary winding, and
   wherein the control unit is configured to control said switch according to said signal representative of at least the current value in the secondary winding,
   wherein said control unit is configured to control the driving module to do a succession of duty cycles, each divided into a first interval and a second interval corresponding to an opening interval and a closing interval, respectively, of the switch, and
   wherein said control unit comprising a controller module that, in each cycle, is configured to:
      detect and/or calculate at least a current value representative of a mean current value during a previous cycle, compare said current value with a reference value representative of a mean preset value, calculate, according to said comparison, a change in the duty cycle of the driving signal (G), send, to said driving module, a signal related to said change of the duty cycle;
   and/or
      detect and/or calculate at least a current value representative of a current amplitude during a previous cycle, compare said representative value with a preset reference value of said amplitude, calculate, according to said comparison, a change in a frequency of the driving signal (G), send to said driving module (11) a signal related to said change of the frequency.

13. A method of driving an electronic ignition system for an internal combustion engine that includes an ignition coil provided with at least a primary winding and a secondary winding that is connectable to a spark plug, and a switch that is connected to said primary winding and that is drivable into an open position and/or a closed position in order to prevent or allow, respectively, a passage of current through said primary winding; said method comprising:
   closing the switch for a predetermined first time interval;
   subsequently opening said switch for a predetermined second time interval; said first and said second time intervals defining a cycle;
   detecting at least a current value in the secondary winding during said first and said second interval; and
   calculating one or more driving parameters of the switch in a subsequent cycle, comprising a duty cycle and/or a driving signal frequency sent by a driving module to the switch, according to said current value detected in the secondary winding;
   wherein said calculating step comprises at least a sampling step of a first current value identifying the first interval, and a second current value identifying the second interval;
   wherein said calculating step comprises:
      summing said first value with said second value to obtain a value representative of a mean current value in said cycle, comparing said value representative of the mean current value in said duty cycle with a reference value of the mean value, determining a value of the duty cycle for a driving signal (G) of the switch according to the result of said comparison, driving the switch, in the next duty cycle, by a PWM modulation and duty cycle corresponding to said determined value;
   and/or
      calculating the difference between said first value and said second value in order to obtain said value representative of a current amplitude in said duty cycle, comparing said representative value with a reference value of the current amplitude in said duty cycle, determining a value of the frequency for a driving signal (G) of the switch according to the result of said comparison and driving the switch, in the next duty cycle, by a PWM modulation and frequency corresponding to said determined value.

* * * * *